US011951980B2

(12) United States Patent
Weiss et al.

(10) Patent No.: US 11,951,980 B2
(45) Date of Patent: Apr. 9, 2024

(54) METHOD AND APPARATUS FOR CONTROLLING A SAFETY DEVICE OF A VEHICLE, AND SAFETY SYSTEM FOR A VEHICLE

(71) Applicant: Robert Bosch GmbH, Stuttgart (DE)

(72) Inventors: Christian Weiss, Leonberg (DE); Gyorgy Csaba, Budapest (HU); Heiko Kirn, Bietigheim-Bissingen (DE); Nina Braunert, Leonberg-Warmbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 379 days.

(21) Appl. No.: 17/453,436

(22) Filed: Nov. 3, 2021

(65) Prior Publication Data

US 2022/0144262 A1    May 12, 2022

(30) Foreign Application Priority Data

Nov. 9, 2020    (DE) ...................... 10 2020 214 030.8

(51) Int. Cl.
*B60W 30/095*    (2012.01)
(52) U.S. Cl.
CPC ..... *B60W 30/0956* (2013.01); *B60W 2520/10* (2013.01); *B60W 2520/105* (2013.01);
(Continued)
(58) Field of Classification Search
CPC ......... B60W 30/0956; B60W 2520/10; B60W 2520/105; B60W 2520/12; B60W 2520/125; B60W 2554/4041; B60W 2554/4042; B60W 2554/4043; B60W 10/18; B60W 10/20; B60W 30/09; B60W 30/095; B60W 30/0953; B60W 10/04; B60W 21/0134; B60W 30/08;
(Continued)

(56) References Cited

U.S. PATENT DOCUMENTS

| | | | |
|---|---|---|---|
| 6,685,863 B1 * | 2/2004 | Yabushita | B29C 45/1671 264/254 |
| 2016/0339910 A1 * | 11/2016 | Jonasson | B60W 10/20 |
| 2020/0133266 A1 * | 4/2020 | Raichelgauz | G06V 10/255 |

FOREIGN PATENT DOCUMENTS

| | | |
|---|---|---|
| DE | 102004056120 A1 | 5/2006 |
| DE | 102008010667 A1 | 8/2008 |

(Continued)

*Primary Examiner* — Behrang Badii
(74) *Attorney, Agent, or Firm* — NORTON ROSE FULBRIGHT US LLP; Gerard A. Messina

(57) ABSTRACT

A method for controlling a safety device of a vehicle. The safety device reacts to an imminent collision of the vehicle with a collision object by way of an intervention in a longitudinal and/or lateral guidance of the vehicle. The method includes reading in environment data and trip data regarding the collision object and of the vehicle, and intervention data regarding a planned intervention of the safety device; ascertaining a first expected impingement region of the collision object on the vehicle, and a second expected impingement region of the collision object on the vehicle; executing an evaluation of a location of the first expected impingement region and of a location of the second expected impingement region relative to subregions referred to the vehicle, using reference data; generating, depending on a result of the evaluation, a control signal for the safety device.

9 Claims, 3 Drawing Sheets

(52) U.S. Cl.
CPC ... *B60W 2520/12* (2013.01); *B60W 2520/125* (2013.01); *B60W 2554/4041* (2020.02); *B60W 2554/4042* (2020.02); *B60W 2554/4043* (2020.02)

(58) Field of Classification Search
CPC ................ B60W 40/02; B60W 40/10; B60W 2554/404; B60R 21/0134
See application file for complete search history.

(56) References Cited

FOREIGN PATENT DOCUMENTS

| | | |
|---|---|---|
| DE | 102012203228 A1 | 9/2013 |
| DE | 102013205877 A1 | 10/2014 |
| DE | 102016013601 A1 | 6/2017 |
| DE | 102019201590 A1 | 8/2020 |

\* cited by examiner

METHOD AND APPARATUS FOR CONTROLLING A SAFETY DEVICE OF A VEHICLE, AND SAFETY SYSTEM FOR A VEHICLE

CROSS REFERENCE

The present application claims the benefit under 35 U.S.C. § 119 of German Patent Application No. DE 102020214030.8 filed on Nov. 9, 2020, which is expressly incorporated herein by reference in its entirety.

FIELD

The present invention relates to an apparatus and a method for controlling a safety device of a vehicle. A further subject of the present invention is a computer program.

Driver assistance systems that can perform automatic emergency braking of a vehicle as an intervention in the case of an acute risk of collision with one or several other traffic participants are, for example, convention. In such an intervention a displacement of an impingement point, to be expected without the intervention, of another traffic participant on the vehicle into an undesired region of the vehicle can occur in some circumstances.

SUMMARY

The present invention provides a method, also an apparatus that uses that method, and a corresponding computer program, for controlling a safety device of a vehicle. The features disclosed herein make possible advantageous refinements of and improvements to the apparatus disclosed herein.

In accordance with example embodiments of the present invention, in particular in the context of an imminent collision of a vehicle with a collision object, an impingement region and a possible displacement of the impingement region with consideration of an intervention of a safety device or of an assistance function of the vehicle can be determined, and can be used to control the safety device. For example, the impingement region and possible displacement of the impingement region can be predicted for consideration in the context of activation of an autonomous emergency braking (AEB) function for side impact scenarios or the like. In other words, a collision point of a collision object on the host vehicle can, in particular, be determined or predicted as a basis for an activation decision of a safety device, in particular an autonomous safety device. For this, for example, a detection of the expected collision region can be carried out and an ascertainment can be made as to whether and how that collision region will be displaced to a favorable or unfavorable position by a planned intervention of the safety device, in particular by adapting a velocity or trajectory of the host vehicle in the event of an autonomous braking or acceleration operation, or in the case of an autonomous evasive maneuver.

Advantageously, in accordance with embodiments of the present invention, in particular an improvement in occupant safety can be achieved by estimating the impingement region for cross traffic. Depending on a nature of the planned intervention or activated reaction pattern, for example a length and an intensity of an autonomous braking intervention or evasive maneuver, the collision can be avoided or the impingement region can be displaced along a contour of the host vehicle, for example, in the case of a reduction in the velocity of the host vehicle because of a time gain that results in a later arrival in a collision zone. In particular, an accident attenuation can be achieved by a reduction in the velocity of the host vehicle, in which context a collision region can be displaced, by the intervention of the safety device, for example, from a rear side region to a front side region or to a central front region of the host vehicle. In accordance with embodiments, a worsening of an accident sequence due to an intervention by the safety device can, in particular, also be avoided, by the fact that in the context of an expected displacement of the collision region into the region of the passenger compartment of the host vehicle, the planned intervention can be prevented even if a reduction in the velocity of the host vehicle thereby fails to occur. For example, in particular, a direct impact onto the passenger compartment of the vehicle, with possibly more-serious injuries to the occupants, can be reliably prevented. In particular, an advantageous modification of the collision region on the vehicle, and if applicable of the entire collision event, can be made possible by displacing the impingement region by suitable application of control to the safety device. It is advantageous to determine the collision region, since estimating the collision region rather than a collision point more accurately describes the deformation region. This is because in the real world, what collides is not only a collision point but instead a certain region. It is thus possible in particular to improve a collision estimate by estimating the collision region rather than only a collision point.

In accordance with the present invention, a method for controlling a safety device of a vehicle is provided, the safety device being embodied to react to an imminent collision of the vehicle with a collision object by way of an intervention in a longitudinal and/or lateral guidance of the vehicle. In accordance with an example embodiment of the present invention, the method includes the following steps:

reading in, from an interface to at least one environment sensor of the vehicle, environment data regarding a position, a velocity and, additionally or alternatively, an acceleration of the collision object in an environment of the vehicle; from an interface to at least one trip data sensor of the vehicle, trip data regarding a position, a velocity and, additionally or alternatively, an acceleration of the vehicle; and from an interface to the safety device, intervention data regarding a planned intervention of the safety device;

ascertaining a first expected impingement region of the collision object on the vehicle using the environment data and the trip data, and a second expected impingement region of the collision object on the vehicle using the environment data, the trip data, and the intervention data;

executing an evaluation of a location of the first expected impingement region and of a location of the second expected impingement region relative to subregions referred to the vehicle, using reference data that define, for each subregion, an evaluation factor that depends on an effect of the location of an expected impingement region in the subregion on a safety status of at least one occupant of the vehicle; and generating, depending on a result of the evaluation, a control signal for output to an interface to the safety device, the control signal having at least one control parameter for controlling the safety device.

This method can be implemented, for example, in software or hardware or in a mixed form of software and hardware, for example in a control device or an apparatus. The vehicle can be a motor vehicle, in particular a passenger car or the like. The safety device can be embodied to bring about an autonomous emergency braking operation and, additionally or alternatively, an autonomous evasive maneuver of the vehicle. The collision object can be an external vehicle or a stationary object or obstacle. The environment data can be data detected relative to the vehicle. The at least one environment sensor can encompass, for example, a camera, a radar device and, additionally or alternatively, a lidar sensor of the vehicle. The intervention data can represent information regarding a planned duration and/or a planned amplitude of an activation of a braking system, a steering system, a transmission and, additionally or alternatively, an engine of the vehicle. The first expected impingement region can represent an impingement point in the absence of the planned intervention. The second expected impingement region can represent an impingement region with consideration of the planned intervention. An impingement region can take into account a deformation property of sub-portions of the vehicle. Each evaluation factor can be predefined on the basis of measurements, experiments and, additionally or alternatively, statistical methods. Each evaluation factor can represent an expected injury severity for occupants in the context of a location of an impingement region in the pertinent subregion. A subregion can encompass a sub-portion of the vehicle and, additionally or alternatively, a region, adjacent to a sub-portion of the vehicle, of an environment of the vehicle. The at least one control parameter can represent a duration and/or an amplitude of an activation of a braking system, a steering system, a transmission and, additionally or alternatively, an engine of the vehicle.

In accordance with an embodiment of the present invention, reference data that define, for at least one subregion in the region of a passenger compartment of the vehicle, a first evaluation factor that represents an effect having a first damage potential, and define, for at least one subregion outside a region of the passenger compartment, a second evaluation factor that represents an effect having a second damage potential, can be used in the executing step. The first damage potential can be greater than the second damage potential. A damage potential can be occupant-related and, additionally or alternatively, vehicle-structure-related. An embodiment of this kind offers the advantage that a decision regarding activation or deactivation of the intervention of the safety device can be made in simple, reliable, and exact fashion.

Reference data whose evaluation factors depend on a collision-related deformation of a sub-portion of the vehicle in at least one of the subregions can also be used in the executing step. The deformation can be defined as a vehicle deformation index (VDI, in particular VDI3). An embodiment of this kind offers the advantage of making possible a reliable statement as to which impingement region location is to be assumed to be less harmful for occupants.

In accordance with an example embodiment of the present invention, in the generating step, the control signal can furthermore be generated with at least one control parameter that brings about an enabling or a suppression of the planned intervention of the safety device. For example, an enabling of the planned intervention can be brought about if the location of the second expected impingement region is in a subregion whose evaluation factor is more favorable for safety than a further evaluation factor of a further subregion having the location of the first expected impingement region. For example, a suppression of the planned intervention can be brought about if the location of the first expected impingement region is in a subregion whose evaluation factor is more favorable for safety than a further evaluation factor of a further subregion having the location of the second expected impingement region. An advantageous displacement of the impingement region into a subregion that is less objectionable for safety can thereby be made possible by enabling or suppressing the planned intervention.

Additionally or alternatively, in the generating step the control signal can be generated with at least one control parameter that brings about a modification of the planned intervention of the safety device. A modified intervention of the safety device can be brought about in this context. The control signal can be generated using a result of an evaluation in which a location of a third expected impingement region that results in the context of the modified intervention is evaluated. An embodiment of this kind offers the advantage that the location of an expected impingement region can be optimized even when the first expected impingement region and the second expected impingement region happen to be unfavorably located.

In addition, in the generating step the control signal can be generated with at least one control parameter that brings about control of a duration and, additionally or alternatively, of an amplitude of the planned intervention. An embodiment of this kind offers the advantage that the safety device can be controlled in simple, reliable, and accurate fashion.

The present invention furthermore provides an apparatus that is embodied to carry out, control, or implement, in corresponding devices, the steps of a variant of a method in accordance with the present invention. The object on which the present invention is based can also be quickly and efficiently achieved by this variant embodiment of the present invention in the form of an apparatus.

For this, the apparatus can have at least one computation unit for processing signals or data, at least one storage unit for storing signals or data, at least one interface to a sensor or an actuator for reading in sensor signals from the sensor or for outputting data signals or control signals to the actuator, and/or at least one communication interface for reading in or outputting data that are embedded in a communication protocol. The computation unit can be, for example, a signal processor, a microcontroller, or the like; the memory unit can be a flash memory, an EEPROM, or a magnetic storage unit. The communication interface can be embodied to read in or output data wirelessly and/or in wire-based fashion; a communication interface that can read in or output wire-based data can, for example, electrically or optically read in those data from a corresponding data transfer line or output them into a corresponding data transfer line.

An "apparatus" can be understood in the present case as an electrical device that processes sensor signals and, depending thereon, outputs control signals and/or data signals. The apparatus can have an interface that can be embodied in hardware- and/or software-based fashion. With a hardware-based embodiment the interfaces can be, for example, part of a so-called "system ASIC" that contains a wide variety of functions of the apparatus. It is also possible, however, for the interfaces to be independent integrated circuits or to be made up at least in part of discrete components. With a software-based embodiment, the interfaces can be software modules that are present, for example, on a microcontroller alongside other software modules.

In an advantageous embodiment of the present invention, the apparatus controls a safety device of the vehicle for occupant protection. The apparatus can access for that purpose, for example, sensor signals or sensor data such as environment data, trip data, and intervention data. Control is applied using the control signal by way of the safety device via actuators that are associated with a braking system, a steering system, a transmission and, additionally or alternatively, an engine of the vehicle.

In accordance with an example embodiment of the present invention, a safety system for a vehicle is also presented, the safety system having the following features:

an embodiment of the apparatus recited above; and the safety device, the safety device and the apparatus being signal-transferringly connected to one another.

In the context of the safety system, an embodiment of the apparatus described above can advantageously be used or utilized to control the safety device, in particular in the context of a recognized imminent collision.

Also advantageous is a computer program product or computer program having program code that can be stored on a machine-readable medium or storage medium such as a semiconductor memory, a hard-drive memory, or an optical memory, and can be used to carry out, implement, and/or control the steps of the method in accordance with one of the embodiments described above, in particular when the program product or program is executed on a computer or an apparatus.

Exemplifying embodiments of the approach presented here are explained in further detail in the description below and are depicted in the figures.

DETAILED DESCRIPTION OF EXAMPLE EMBODIMENTS

Figure 1:
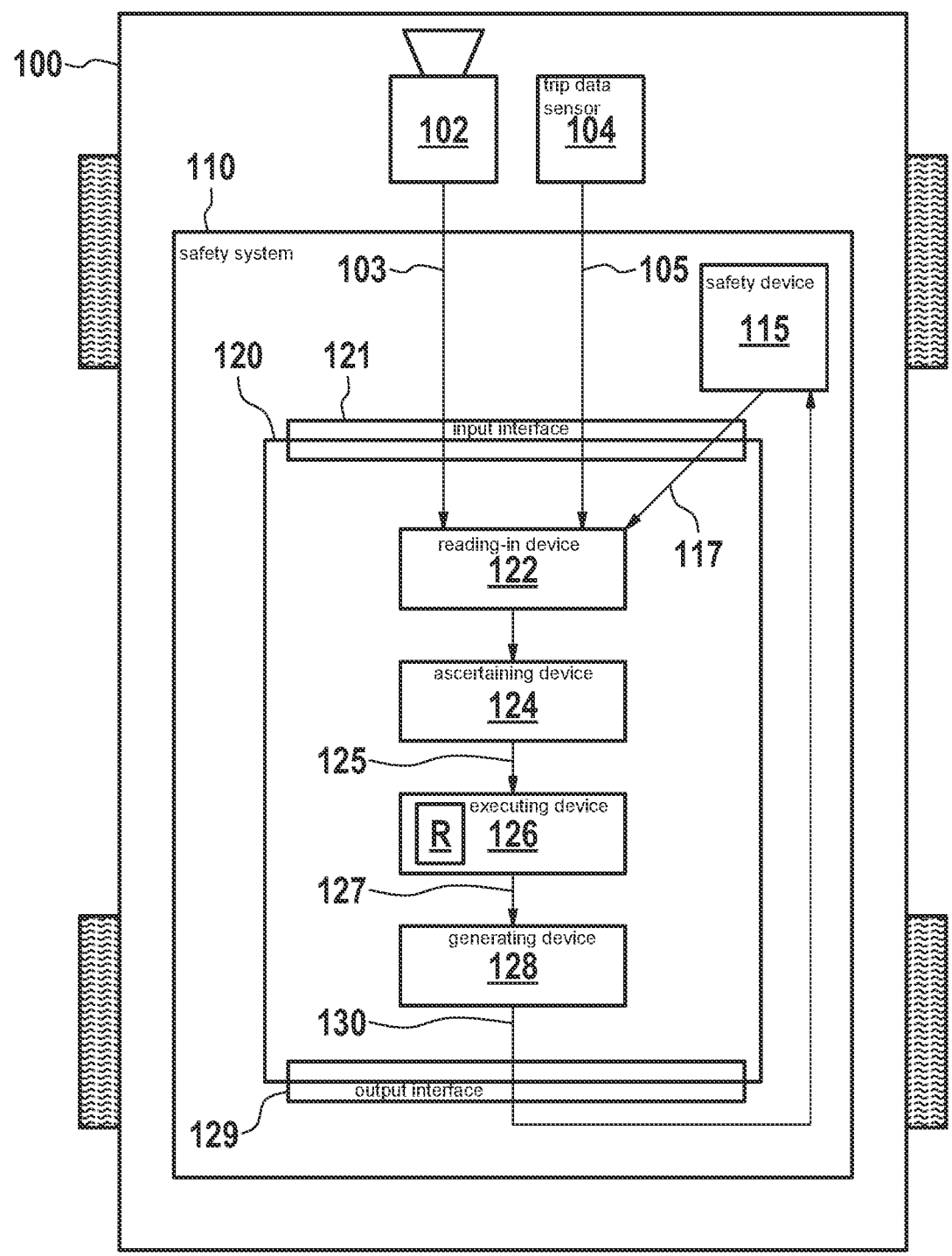
FIG. 1 schematically depicts a vehicle having a safety system, in accordance with an exemplifying embodiment of the present invention.

Before exemplifying embodiments of the present invention are described below in more detail, the background and principles of exemplifying embodiments will first be briefly discussed.

In active safety systems such as the safety system presented here, information from environment sensors, for instance radar or video, and an inherent motion, can be used to draw conclusions as to the criticality of a traffic situation. Because of viewing angle limitations of available systems for active safety, which are often equipped with front sensors having a limited viewing angle, the focus is, for example, on accidents involving traffic moving in longitudinally or slowly from the side. In such accidents, an opposing traffic participant collides primarily with a front region of the host vehicle, regardless of whether the system does or does not activate. Systems that use additional sensors, or sensors having no relevant limitations on the viewing angle, for instance corner radar sensors, can also react to traffic moving in rapidly from the side. Such application instances in the context of cross traffic are characterized in that collisions happen more frequently in the side region of the host vehicle.

A front cross traffic assist (FCTA) function can encompass, for example, the following reaction pattern:

Visual information that informs a driver of approaching cross traffic if the host vehicle is, for example, stationary at an intersection with poor visibility because of a viewing impediment.

Preventing initial movement, if a collision is imminent due to initial movement and driving into the travel path of the cross traffic.

Activation of suspension stiffening, increased brake-system pressure to move the brake pads against the brake disc, so-called "prefill."

Optionally: braking assistance triggered by the driver which generates additional brake pressure if necessary as emergency braking assistance.

Autonomous emergency braking, partial or complete, in the case of a detected imminent collision with cross traffic.

Optionally: activation of passive safety systems, for instance airbags, if a collision was unavoidable; activation of autonomous emergency steering (AES) to optimize a collision orientation.

A collision in an intersection scenario can be prevented by a front cross traffic assistance function in combination with an autonomous emergency braking function (FCTA-AEB function). It can also be the case that the collision is merely displaced into another region of the host vehicle. For example, if the collision object or target vehicle would collide with the host vehicle in the rear-end region without an active FCTA-AEB function, it may happen that the collision object collides with the passenger compartment of the host vehicle in the context of active emergency braking or an FCTA-AEB function. An ascertainment, and optional displacement, of the impingement point can be used in order to ensure that the FCTA-AEB function more reliably improves the situation for the occupants of the host vehicle. The ascertainment and optional displacement of the impingement point are based on the assumption that the target vehicle or collision object and the host vehicle collide at a single point. The collision object and the host vehicle in fact collide in a specified region, however, since the collision object has a width. In addition, the deformed region of the host vehicle might in fact be larger than that part of the collision object which collides with the host vehicle. Occupant safety can be further improved if what is ascertained, in accordance with exemplifying embodiments of the present invention, is not the impingement point but rather the impingement region.

Actual conditions can be more accurately replicated with ascertainment of an impingement region instead of an impingement point, and with evaluation and optional execution of a displacement of the impingement region instead of a displacement of a displacement point, since the collision object has a width. The collision object might collide with the host vehicle if the FCTA-AEB function cannot completely prevent a collision but merely results in a displacement of the collision region. Ascertaining this collision region rather than only a collision point is advantageous because the collision region more accurately describes which parts of the host vehicle will be deformed. A knowledge of which parts of the host vehicle will be deformed can help prevent deformation of the passenger compartment, and therefore injuries to occupants, by the fact that the collision region is displaced away from the passenger compartment. An improvement in occupant safety with a displacement of a collision region can be achieved by partial braking or suppressed braking instead of emergency braking; in particular, other system reactions, such as acceleration and/or evasive action, are also suitable for a displacement of the collision region. A knowledge of which parts of the host vehicle would be deformed therefore helps improve the safety status of the occupants of the host vehicle.

In the description below of useful exemplifying embodiments of the present invention, identical or similar reference characters are used for elements that are depicted in the various Figures and function similarly, repeated description of those elements being omitted.

FIG. 1 schematically depicts a vehicle 100 having a safety system 110, in accordance with an exemplifying embodiment. Vehicle 100 is a motor vehicle, for example a passenger car. All that is shown of vehicle 100 in the depiction of FIG. 1 by way of example is an environment sensor 102, a trip data sensor 104, and safety system 110. Safety system 110 is embodied to execute or bring about an autonomous emergency braking operation and/or an autonomous evasive maneuver of vehicle 100 in the event of an imminent collision of vehicle 100 with a collision object.

Environment sensor 102 is embodied to detect an environment of vehicle 100. More precisely, environment sensor 102 is embodied to detect a position, a velocity, and/or an acceleration of the collision object in the environment of vehicle 100. Environment sensor 102 is further embodied to furnish environment data 103 that represent the detected position, velocity, and/or acceleration of the collision object.

Trip data sensor 104 is embodied to detect trip data 105 of vehicle 100. More precisely, trip data sensor 104 is embodied to detect, as trip data 105, a position, a velocity, and/or an acceleration of vehicle 100. Trip data sensor 104 is furthermore embodied to furnish trip data 105.

Safety system 110 encompasses a safety device 115 and an apparatus 120 for controlling safety device 115. Safety device 115 and apparatus 120 are signal-transferringly connected to one another. Safety system 110, more precisely apparatus 120, is signal-transferringly connected to environment sensor 102 and to trip data sensor 104. Safety device 115 is embodied to react, by way of an intervention in a longitudinal and/or transverse guidance of vehicle 100, to an imminent collision of vehicle 100 with a collision object. Safety device 115 is also embodied to furnish intervention data 117 regarding a planned intervention of safety device 115. Apparatus 120 can also be referred to as a "control apparatus" or "control device."

Apparatus 120 encompasses an input interface 121, a reading-in device 122, an ascertaining device 124, an executing device 126, a generating device 128, and an output interface 129. Reading-in device 122 is embodied to read in environment data 103, trip data 105, and intervention data 117 from input interface 121. Apparatus 120 is signal-transferringly connected via input interface 121 to environment sensor 102, to trip data sensor 104, and to safety device 115. Reading-in device 122 is also embodied to forward the read-in data to ascertaining device 124. Ascertaining device 124 is embodied to ascertain, using environment data 103 and trip data 105, a first expected impingement region of the collision object on vehicle 100. Ascertaining device 124 is further embodied to ascertain, using environment data 103, trip data 105, and intervention data 117, a second expected impingement region of the collision object on vehicle 100. Ascertaining device 124 is also embodied to forward ascertained data 125, which represent the ascertained first expected impingement region and the ascertained second expected impingement region, to executing device 126.

Executing device 126 is embodied to receive ascertained data 125 from ascertaining device 124. Executing device 126 is embodied to execute, using reference data R, an evaluation of a location of the first expected impingement region and of a location of the second expected impingement region relative to subregions referred to vehicle 100. Reference data R define, for each subregion, an evaluation factor that depends on an effect of the location of an expected impingement region in the subregion on a safety status of at least one occupant of vehicle 100. Executing device 126 is also embodied to forward result data 127, which represent a result of the evaluation, to generating device 128. Generating device 128 is embodied to generate, depending on the result of the evaluation, a control signal 130 for output to output interface 129 to safety device 115. Control signal 130 encompasses at least one control parameter for controlling safety device 115. Apparatus 120 is embodied to output control signal 130 to output interface 129 to safety device 115.

In accordance with an exemplifying embodiment, executing device 126 is embodied to use reference data R, which define for at least one subregion in the region of a passenger compartment of vehicle 100 a first evaluation factor that represents an effect having a first damage potential, and define for at least one subregion outside a region of the passenger compartment a second evaluation factor that represents an effect having a second damage potential. The first damage potential is greater than the second damage potential. In particular, executing device 126 is embodied to use reference data R whose evaluation factors depend on a collision-related deformation of a sub-portion of vehicle 100 in at least one of the subregions.

In accordance with an exemplifying embodiment, generating device 128 is embodied to generate control signal 130 with at least one control parameter that brings about an enabling or a suppression of the planned intervention of safety device 115. Additionally or alternatively, generating device 128 is embodied to generate control signal 130 with at least one control parameter that brings about a modification of the planned intervention of safety device 115. In particular, generating device 128 is embodied to generate control signal 130 with at least one control parameter that brings about control of a duration and/or an amplitude of the planned intervention.

Figure 2:
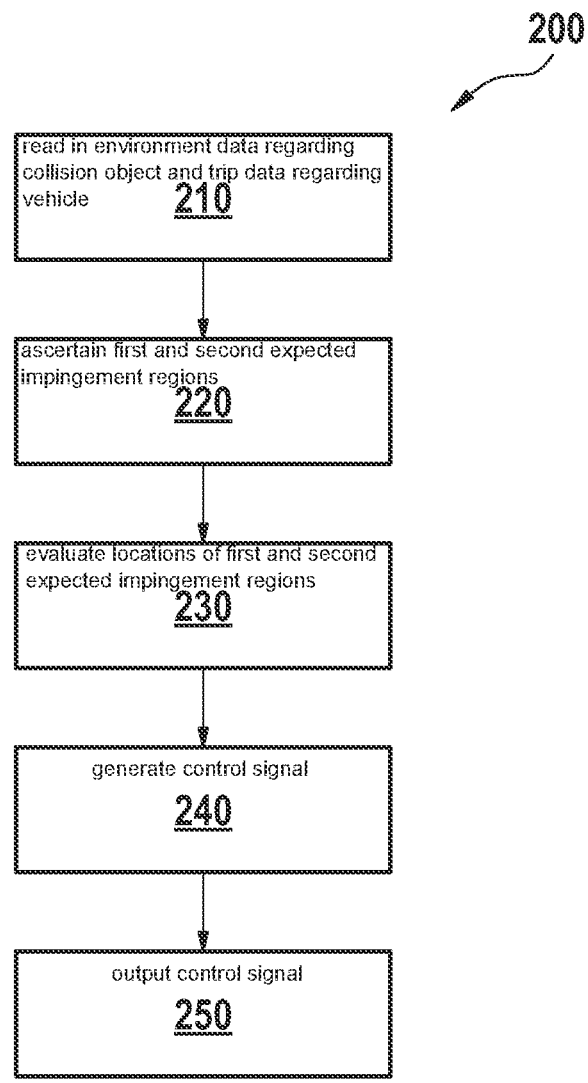
FIG. 2 is a flow chart for a control method, in accordance with an exemplifying embodiment of the present invention.

FIG. 2 is a flow chart of a control method 200, in accordance with an exemplifying embodiment. Control method 200 is executable in order to control a safety device of a vehicle. Control method 200 is executable in order to control the safety device of FIG. 1 or a similar safety device. Control method 200 is also executable using the apparatus of FIG. 1 or a similar apparatus. Control method 200 encompasses a reading-in step 210, an ascertaining step 220, an executing step 230, and a generating step 240. An outputting step 250 is additionally shown.

In reading-in step 210, environment data regarding a position, a velocity, and/or an acceleration of the collision object in an environment of the vehicle are read in from an interface to at least one environment sensor of the vehicle. In addition, in reading-in step 210 trip data regarding a position, a velocity, and/or an acceleration of the vehicle are read in from an interface to at least one trip data sensor of the vehicle. In reading-in step 210, intervention data regarding a planned intervention of the safety device are also read in from an interface to the safety device.

In ascertaining step 220, a first expected impingement region of the collision object on the vehicle is then ascertained using the environment data and the trip data. A second expected impingement region of the collision object on the vehicle is also ascertained in ascertaining step 220 using the environment data, the trip data, and the intervention data. An evaluation of a location of the first expected impingement region and of a location of the second expected impingement region, relative to subregions referred to the vehicle, is then in turn executed in executing step 230 using reference data. The reference data define, for each subregion, an evaluation factor that depends on an effect of the location of an expected impingement region in the subregion on a safety status of at least one occupant of the vehicle. In generating step 240, a control signal for output to an interface to the safety device is then generated depending on a result of the evaluation executed in executing step 230. The control signal encompasses at least one control parameter for controlling the safety device.

In accordance with an exemplifying embodiment, control method 200 also encompasses outputting step 250. In outputting step 250, the control signal generated in generating step 240 is outputted to the interface to the safety device.

Figure 3:
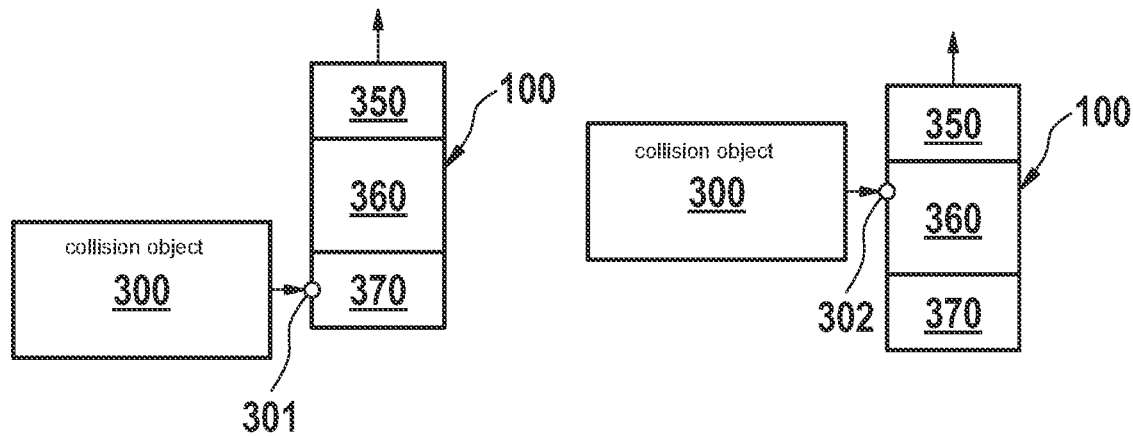
FIG. 3 schematically depicts impingement points of a collision object on a vehicle, in accordance with an example embodiment of the present invention.

FIG. 3 schematically depicts impingement points 301, 302 of a collision object 300 on a vehicle 100. A first subregion 360 in the region of a passenger compartment of vehicle 100 and, by way of example, two further subregions 350 and 370 outside the region of the passenger compartment of vehicle 100, are respectively shown. Also depicted are a travel direction of vehicle 100 and a travel direction of collision object 400. A first impingement point 301 without intervention of an autonomous emergency braking function of vehicle 100 is located in further subregion 470, in this case the rear end of vehicle 100. A second impingement point 302 in the context of an intervention of the autonomous emergency braking function of vehicle 100 is located in first subregion 360, i.e. in the region of the passenger compartment of vehicle 100. FIG. 3 shows an example of an unfavorable displacement of first expected impingement point 301 as a result of an emergency braking operation of vehicle 100. This unfavorable displacement of the impingement point could be prevented if the emergency braking operation were suppressed, or if an only partial braking operation were performed.

Figure 4:
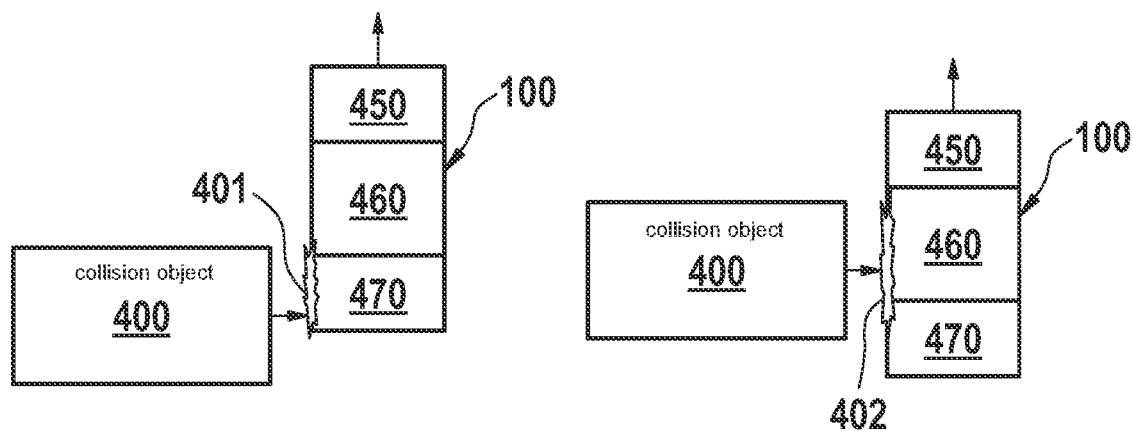
FIG. 4 schematically depicts impingement regions of a collision object on a vehicle, in accordance with an exemplifying embodiment of the present invention.

FIG. 4 schematically depicts impingement regions 401, 402 of a collision object 400 on a vehicle 100, in accordance with an exemplifying embodiment in the context of an imminent collision thereof. Vehicle 100 corresponds to or resembles the vehicle of FIG. 1. FIG. 4 shows first expected impingement region 401 between collision object 400 and vehicle 100 without consideration of the planned intervention of the safety device, and second expected impingement region 402 between collision object 400 and vehicle 100 with consideration of the planned intervention of the safety device. A first subregion 460 in the region of a passenger compartment of vehicle 100 and, by way of example, two further subregions 450 and 470 outside the region of the passenger compartment of vehicle 100, are shown for vehicle 100 in each case. A travel direction of vehicle 100, and a travel direction of collision object 400, are also respectively depicted.

FIG. 4 thus shows, in other words, an example of an unfavorable displacement of first expected impingement region 401 as a result of an emergency braking operation of vehicle 100. First expected impingement region 401 is located in further subregion 470, in this case the rear of vehicle 100. Second expected impingement region 402 is located in first subregion 460, i.e. in the region of the passenger compartment of vehicle 100. This unfavorable displacement of the impingement region can be prevented if the intervention of the safety device (in this case the emergency braking operation) is suppressed; or if the braking characteristic is adapted, in particular in terms of the length and intensity of the braking operation, so that only a partial braking operation is performed.

Because impingement region 401, 402 indicates more accurately than an impingement point which parts of host vehicle 100 will be deformed, it is possible to apportion or control the deceleration of host vehicle 100, for example for a partial braking operation, in such a way that the passenger compartment is not deformed but a collision momentum can nevertheless be reduced. The safety status of the occupants of host vehicle 100 can thereby be improved.

If an exemplifying embodiment encompasses an "and/or" relationship between a first feature and a second feature, this is to be read to mean that the exemplifying embodiment according to one embodiment has both the first feature and the second feature, and according to a further embodiment has either only the first feature or only the second feature.

What is claimed is:

1. A method for controlling a safety device of a vehicle, the safety device being configured to react to an imminent collision of the vehicle with a collision object by way of an intervention in a longitudinal and/or lateral guidance of the vehicle, the method comprising the following steps:
   reading in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding a planned intervention of the safety device;
   ascertaining: (i) a first expected impingement region of the collision object on the vehicle using the environment data and the trip data, and (ii) a second expected impingement region of the collision object on the vehicle using the environment data, the trip data, and the intervention data;
   executing an evaluation of a location of the first expected impingement region and of a location of the second expected impingement region relative to subregions referred to the vehicle, using reference data that define, for each subregion of the subregions, an evaluation factor that depends on an effect of the location of an expected impingement region in the subregion on a safety status of at least one occupant of the vehicle; and
   generating, depending on a result of the evaluation, a control signal for output to an interface to the safety device, the control signal having at least one control parameter for controlling the safety device.

2. The method as recited in claim 1, wherein the reference data include first reference data that define, for at least one subregion in a region of a passenger compartment of the vehicle, a first evaluation factor that represents an effect having a first damage potential, and define, for at least one subregion outside the region of the passenger compartment, a second evaluation factor that represents an effect having a second damage potential, the first reference data being used in the executing step, the first damage potential being greater than the second damage potential.

3. The method as recited in claim 1, wherein the reference data include first reference data whose evaluation factors depend on a collision-related deformation of a sub-portion of the vehicle in at least one of the subregions, the first reference data being used in the executing step (230).

4. The method as recited in claim 1, wherein in the generating step, the control signal is generated with at least one control parameter that brings about an enabling or a suppression of the planned intervention of the safety device.

5. The method as recited in claim 1, wherein in the generating step, the control signal is generated with at least one control parameter that brings about a modification of the planned intervention of the safety device.

6. The method as recited in claim 1, wherein in the generating step, the control signal is generated with at least one control parameter that brings about control of a duration and/or of an amplitude of the planned intervention of the safety device.

7. An apparatus configured to control a safety device of a vehicle, the safety device being configured to react to an imminent collision of the vehicle with a collision object by way of an intervention in a longitudinal and/or lateral guidance of the vehicle, the apparatus configured to:
  read in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding a planned intervention of the safety device;
  ascertain: (i) a first expected impingement region of the collision object on the vehicle using the environment data and the trip data, and (ii) a second expected impingement region of the collision object on the vehicle using the environment data, the trip data, and the intervention data;
  execute an evaluation of a location of the first expected impingement region and of a location of the second expected impingement region relative to subregions referred to the vehicle, using reference data that define, for each subregion of the subregions, an evaluation factor that depends on an effect of the location of an expected impingement region in the subregion on a safety status of at least one occupant of the vehicle; and
  generate, depending on a result of the evaluation, a control signal for output to an interface to the safety device, the control signal having at least one control parameter for controlling the safety device.

8. A safety system for a vehicle, the safety system comprising:
  an apparatus configured to control a safety device of a vehicle, the safety device being configured to react to an imminent collision of the vehicle with a collision object by way of an intervention in a longitudinal and/or lateral guidance of the vehicle, the apparatus configured to:
    read in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding a planned intervention of the safety device,
    ascertain: (i) a first expected impingement region of the collision object on the vehicle using the environment data and the trip data, and (ii) a second expected impingement region of the collision object on the vehicle using the environment data, the trip data, and the intervention data,
    execute an evaluation of a location of the first expected impingement region and of a location of the second expected impingement region relative to subregions referred to the vehicle, using reference data that define, for each subregion of the subregions, an evaluation factor that depends on an effect of the location of an expected impingement region in the subregion on a safety status of at least one occupant of the vehicle, and
    generate, depending on a result of the evaluation, a control signal for output to an interface to the safety device, the control signal having at least one control parameter for controlling the safety device; and
  the safety device, the safety device and the apparatus being signal-transferringly connected to one another.

9. A non-transitory machine-readable storage medium on which is stored a computer program for controlling a safety device of a vehicle, the safety device being configured to react to an imminent collision of the vehicle with a collision object by way of an intervention in a longitudinal and/or lateral guidance of the vehicle, the computer program, when executed by a computer, causing the computer to perform the following steps:
  reading in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding a planned intervention of the safety device;
  ascertaining: (i) a first expected impingement region of the collision object on the vehicle using the environment data and the trip data, and (ii) a second expected impingement region of the collision object on the vehicle using the environment data, the trip data, and the intervention data;
  executing an evaluation of a location of the first expected impingement region and of a location of the second expected impingement region relative to subregions referred to the vehicle, using reference data that define, for each subregion of the subregions, an evaluation factor that depends on an effect of the location of an expected impingement region in the subregion on a safety status of at least one occupant of the vehicle; and
  generating, depending on a result of the evaluation, a control signal for output to an interface to the safety device, the control signal having at least one control parameter for controlling the safety device.

* * * * *